United States Patent [19]

Erdkamp et al.

[11] Patent Number: 5,893,393
[45] Date of Patent: Apr. 13, 1999

[54] COMBINATION SELECTOR AND SHUT OFF VALVE

[75] Inventors: Larry T. Erdkamp, Lincoln; Keith Ziegenbein, Ashland, both of Nebr.

[73] Assignee: KZCO, Inc., Ashland, Nebr.

[21] Appl. No.: 08/886,672

[22] Filed: Jul. 1, 1997

[51] Int. Cl.[6] .................................................. F16K 11/087
[52] U.S. Cl. ................................ 137/625.47; 137/887
[58] Field of Search ............................. 137/884, 887, 137/625.47; 251/310

[56] References Cited

U.S. PATENT DOCUMENTS

| | | | |
|---|---|---|---|
| 4,848,391 | 7/1989 | Miller et al. | 137/884 X |
| 4,890,648 | 1/1990 | Giordano | 137/887 |
| 4,951,711 | 8/1990 | Kunz | 137/625.47 |

*Primary Examiner*—John Fox
*Attorney, Agent, or Firm*—Philip J. Lee

[57] ABSTRACT

A stackable combination selector and shut off valve includes a three-way valve body which supports a two hole ball selectively rotatable for directing fluid flow through either of first and second opposite outlet ports or a central off position wherein flow is blocked to both outlet ports. The valve body preferably includes an internal manifold so that the valve may be stacked with other valves without requiring connection to an independent manifold. The motor control circuitry includes a single pole single throw on-off switch which operates in conjunction with a double pole double throw polarity reversing switch to enable the motor to work in a selected one of two quadrants.

9 Claims, 6 Drawing Sheets

5,893,393

COMBINATION SELECTOR AND SHUT OFF VALVE

BACKGROUND OF THE INVENTION

1. Technical Field

The present invention is directed generally to a combination selector and shut off valve designed particularly for double boom sprayers, or more that use only one boom at a time and corresponding applications in other fluid circuits. More particularly, the present invention is directed to a single valve capable of supplying fluid to either of two booms thus eliminating the need for separate valves for the separate booms. Furthermore, the invention is directed to such an automatic valve including a motor control circuit including remote switches for controlling the valve to direct flow to either boom.

2. Description of the Prior Art

In the past, a sprayer implement including two or more separate booms which were to be operated one at a time required two separate valves, namely an on-off valve and a three-way selector valve used to direct the flow to one boom or the other. The separate valves require separate plumbing and the additional expense of separate installation, labor and parts for both. The additional valves in the flow control circuitry create additional potential for breakdown and maintenance and generally complicate the fluid circuitry. Separate stand alone valves are known which can serve as a combination on-off and selector valve but the absence of an internal manifold in these valves necessitates connection of each to an independent common manifold together with the conduits and fittings required to establish such connections. Finally, many prior art multi-boom sprayers were difficult to operate because they required the operator to leave the cab to turn manual valves.

Accordingly, a primary object of the present invention is to provide a single valve which eliminates the need for separate valves for controlling flow to separate booms or destinations in a multi-boom sprayer or similar fluid circuit.

Another object is to provide an improved valve which serves as both an on-off valve and as a three-way selector valve.

A further object is to provide such a valve which eliminates additional valves and which cleans up and simplifies the sprayer's plumbing.

An associated object is to provide such a valve which substantially reduces the installation labor, the maintenance and parts for the sprayer circuitry.

Another object is to provide such a valve which is power operated and controlled by substantially simplified motor control circuitry including the combination of a single pole single throw on-off switch and a double pole double throw polarity reversing switch which operate in conjunction with dual cams and associated microswitches on the valve motor shaft.

Finally, an object of the invention is to provide such a combination on-off and selector valve which is simple and rugged in construction, economical to manufacture and efficient in operation.

SUMMARY OF THE INVENTION

The stackable combination selector and shut off valve of the present invention includes a valve body defining an internal flow through manifold which renders the valve stackable with the same or associated valves. The valve body has an entry port in communication with the internal manifold for connection to a source of pressurized fluid and an exit port in communication with the internal manifold for connection to the entry port of another valve body. The valve also has first and second outlet ports for directing flow to one or the other of a pair of booms or other destinations. A ball valve is interposed between the internal manifold and the first and second outlet ports, which ball valve is movable between a first position establishing fluid flow from the internal manifold to the first outlet port, a second position blocking fluid flow from the internal manifold to both outlet ports, and a third position establishing fluid flow from the internal manifold to the second outlet port. A valve stem protrudes from the ball valve and is operative to rotate the ball valve between the first, second and third positions.

The valve stem and valve body are adapted for connection to a power head for remote actuated powered operation of the valve. The powerhead is mounted on the valve body and includes a motor having an output shaft operatively connected to the valve stem for rotating the valve stem between the first, second and third positions. A motor control circuit for the powerhead includes a remote master single pole single throw on-off switch operative to establish and break the electrical connection between the motor and a source of electric power, and a polarity reversing double pole double throw switch operative to determine whether the ball valve rotates from the second position to the first or third position in response to actuation of the master single pole single throw switch.

The motor control circuitry further includes dual cams on the motor output shaft and dual microswitches in operative close proximity to the dual cams. One cam has a pair of spaced apart lobes positioned to trip the associated microswitch and stop rotation of the ball valve upon movement of the ball valve to the first or third position and the other cam has a cam lobe situated between the pair of lobes of said one cam and positioned to trip the other microswitch to establish a common off position corresponding to the second or off position of the ball valve.

The valve of the present invention is specifically designed for double boom sprayers that use only one boom at a time. The valve of the present invention eliminates the additional three way selector valves conventionally used to direct the flow to one boom or the other. The valve of the invention does this by acting as both the on-off boom valve and a three-way selector valve, thereby dramatically cleaning up and simplifying the sprayer plumbing. This likewise saves a substantial amount of installation, labor and parts. Finally, the valve of the present invention makes the sprayer much easier to use for the operator, giving him remote control from inside the cab where before, leaving the cab to turn manual valves was the norm.

The valve of the present invention includes a three-way body but has a two hole ball inside it. That ball has an inlet on the bottom that is fed from the valve's internal manifold, and a right angle outlet. Thus only one outlet port of the valve can be energized at a time, while the opposite side of the valve remains in the off position, regardless of whether or not the other side is on or off.

The selection of boom one or boom two outlet ports is accomplished very simply by installing a two position polarity reversing double pole double throw switch on the powerhead wires. This switch is independent of any monitors that may be in the system and is installed by the customer. The powerhead works with any monitor's boom on-off switches. The powerhead is simply wired in the same manner as a standard on-off valve. Simply reversing the polarity of the leads with the double pole double throw switch enables the valve to operate in one quadrant or the other. The ball always operates in a 90-degree fashion.

DESCRIPTION OF THE PREFERRED EMBODIMENT

Figure 1:
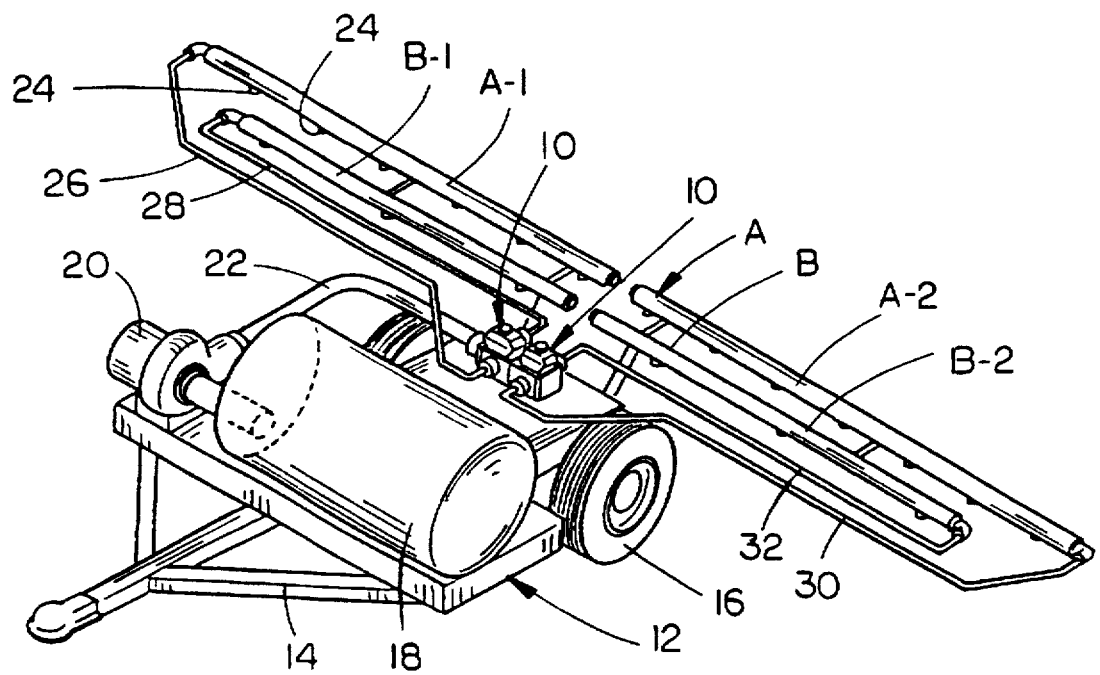
FIG. 1 is a perspective view of a sample agricultural sprayer implement with dual booms operated by the combination selector and shut off valves of the invention.

A pair of the stackable combination selector and shut off valves 10 of the present invention are illustrated in FIG. 1 and mounted onto an agricultural sprayer implement 12 which includes a frame 14 supported on ground wheels 16 for carrying a fluid reservoir 18 connected to a pump 20 for delivering fluid under pressure through a conduit 22 to the valves 10. The implement carries a pair of split booms A and B including rear boom sections A-1 and A-2 and front boom sections B-1 and B-2. The pair of booms are useful in an agricultural sprayer, for example where the rear boom A has nozzles 24 situated at 20 inch spacings whereas front boom B may have the spaced 30 inches apart to accommodate different crop row widths. In FIG. 1, the left combination selector and shut off valve 10 has a first outlet conduit 26 connecting it to one end of rear boom section A-1 and a second outlet conduit 28 connected to one end of front boom section B-1. Likewise, the right valve 10 has a first outlet conduit 30 connecting it to one end of boom section A-2 and a second outlet conduit 32 connecting it to one end of front boom section B-2.

Figure 2:
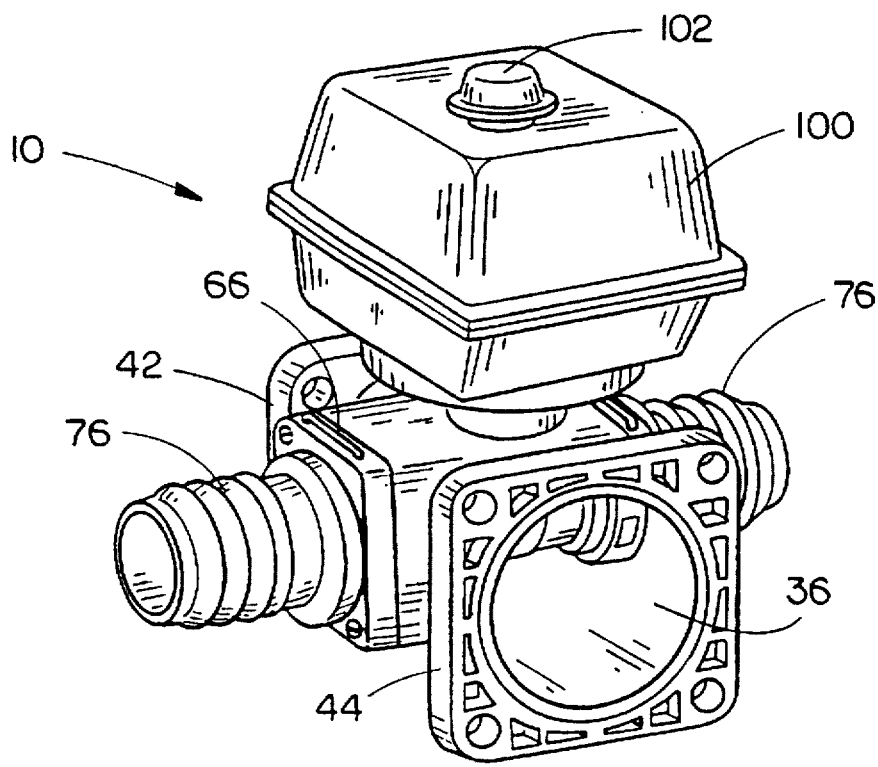
FIG. 2 is a perspective view of the valve of the invention.
Figure 3:
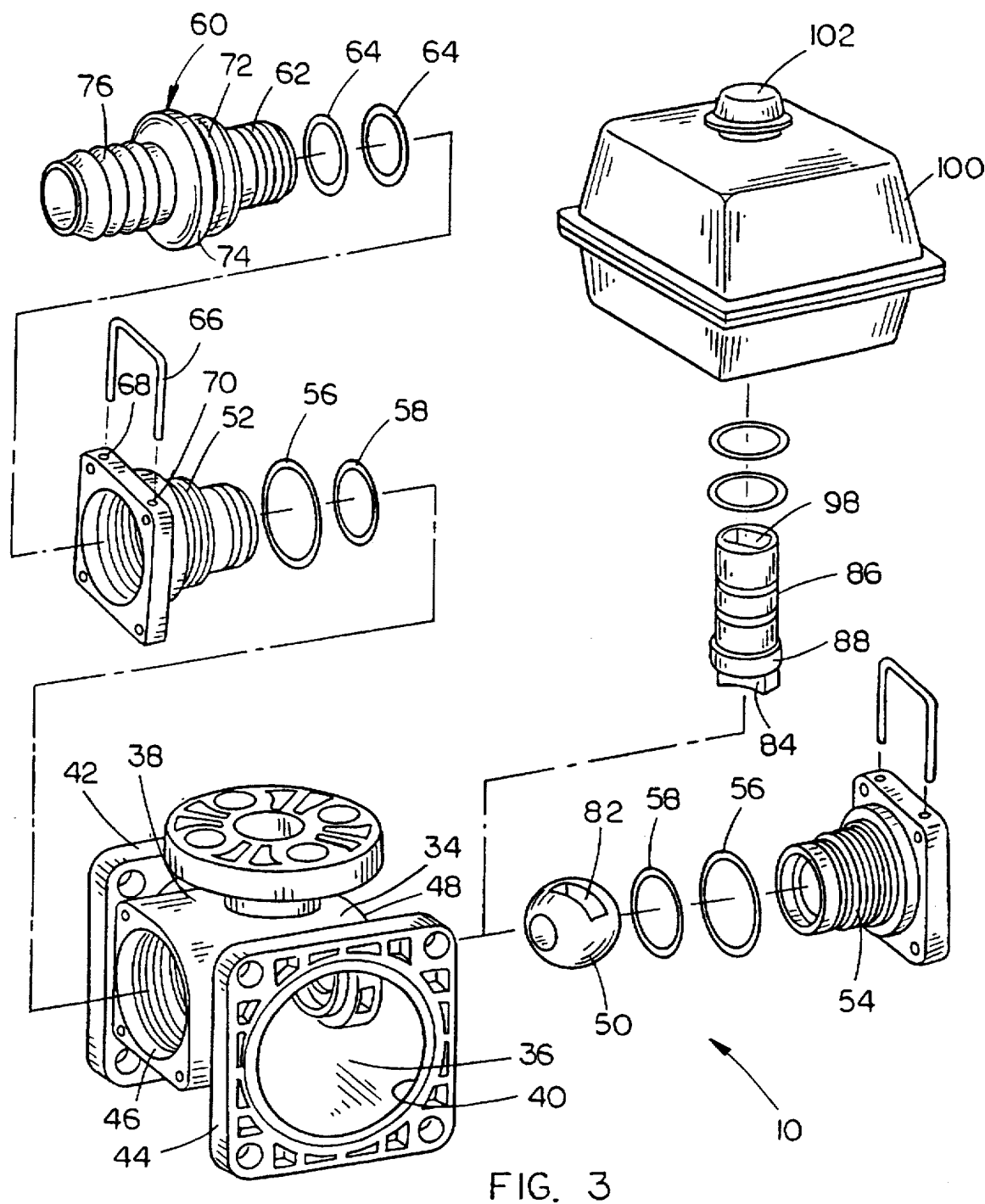
FIG. 3 is an exploded view of the valve of the invention.

The stackable combination selector and shut off valve 10 is shown in greater detail in FIGS. 2 and 3. The valve includes a valve body 34 which defines an internal flow through manifold 36 which remains at all times in communication with an entry port 38 for connection to a source of pressurized fluid such as the first outlet conduit 26, and an exist port 40 adapted for connection to the entry port 38 of another valve or it may simply be sealed with a closure plate, as indicated for the right hand valve in FIG. 1. The entry port is defined and surrounded by a flange 42 and the exit port 40 is defined and surrounded by flange 42.

The valve body also has first and second outlet ports 46 and 48 which communicate at times with the internal manifold 36 depending upon the position of an internal flow control ball 50. Ball 50 is supported within the internal manifold 36 by a pair of valve seat fittings 52 and 54 each of which is threaded into a respective outlet port 46 and 48 and sealed thereto by an o-ring 56. A ball seat ring 58 of Teflon or similar low friction material provides a low friction fluid tight connection between the flow control ball 50 and the respective valve seat fitting 52 or 54. Various types of pipe or conduit connectors may be fit within the valve seat fittings 52 and 54 to establish a connection to a pair of outlet conduits such as 26 and 28. FIGS. 2 and 3 illustrate a hose barb fitting 60 having an inner end 62 which telescopes within the valve seat fitting 52 and is sealed thereto by a pair of o-ring 64. The hose barb fitting 60 is removably retained within the valve seat fitting 52 by a generally U-shaped hair pin 66 which is inserted through slots 68 and 70 and which is received within a peripheral groove 72 in the hose barb fitting 60 just interiorly of collar 74 to retain the hose barb fitting 60 within the valve seat fitting 52.

Whereas this particular fitting 60 is equipped with hose barbs 76 those could be replaced with any other well known hose connectors.

Figure 4:
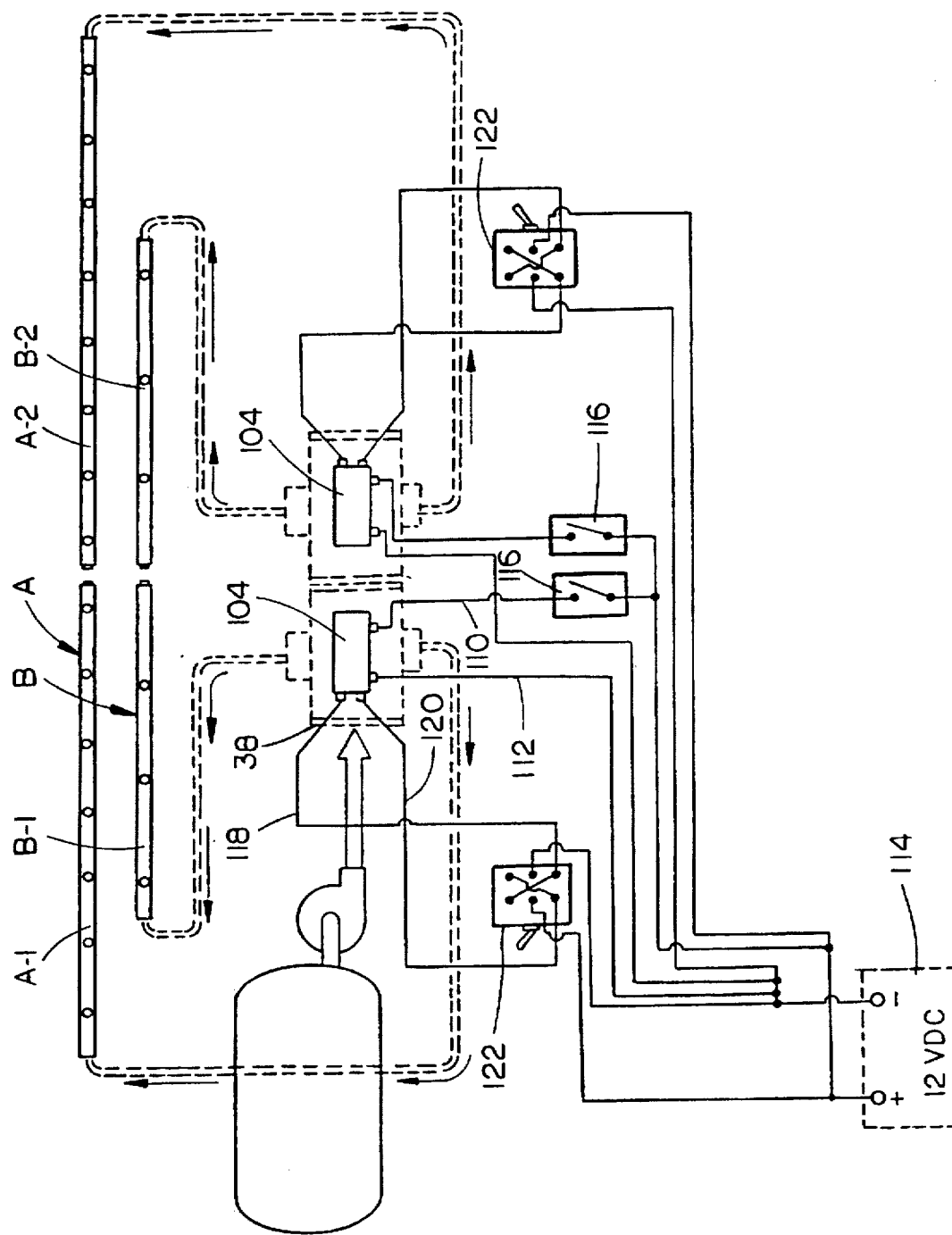
FIG. 4 is a schematic circuit diagram for both the electrical connections to the valves and the flow path of spray fluid.
Figure 5:
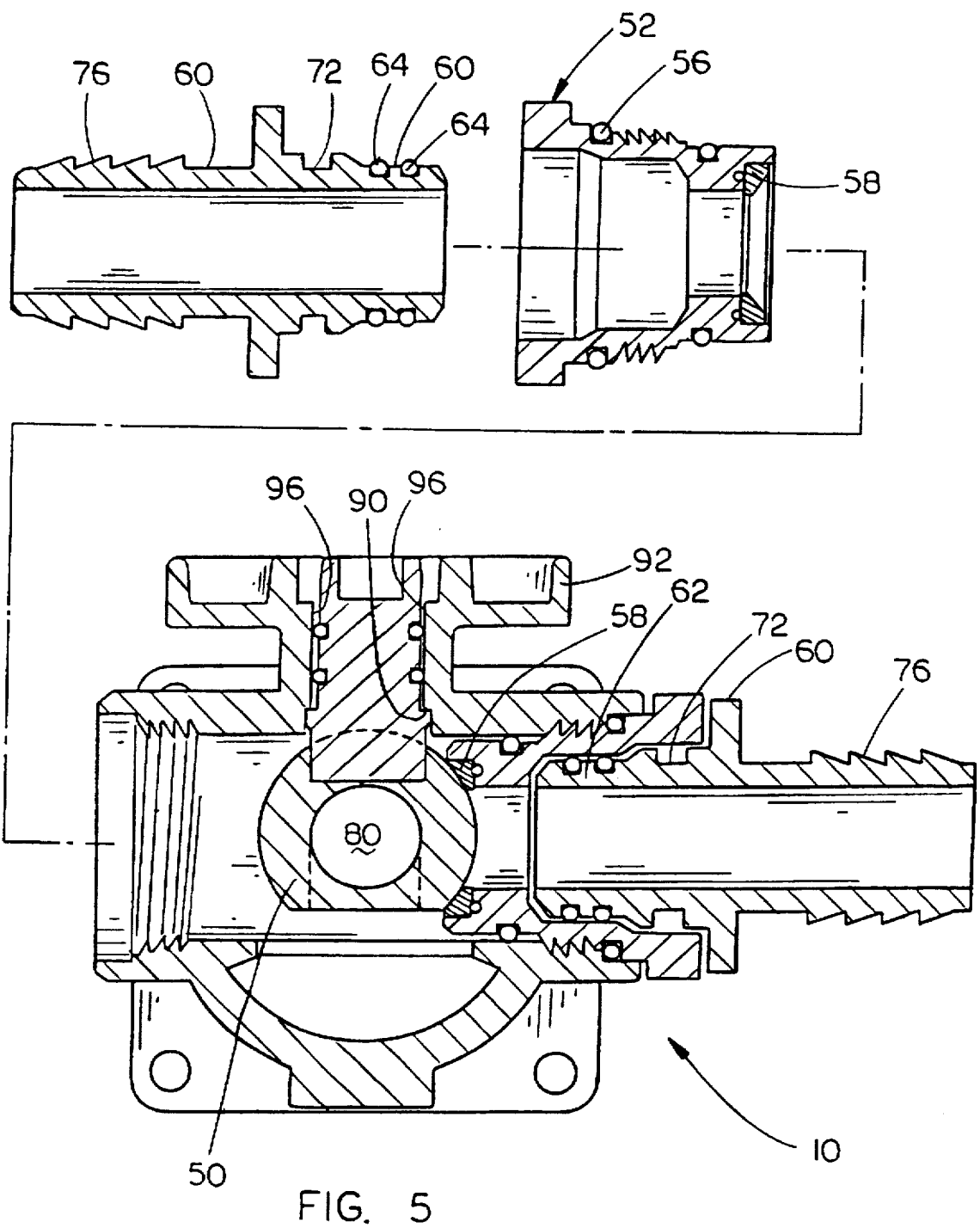
FIG. 5 is a cross sectional view of the valve with the ball in an off position.
Figure 6:
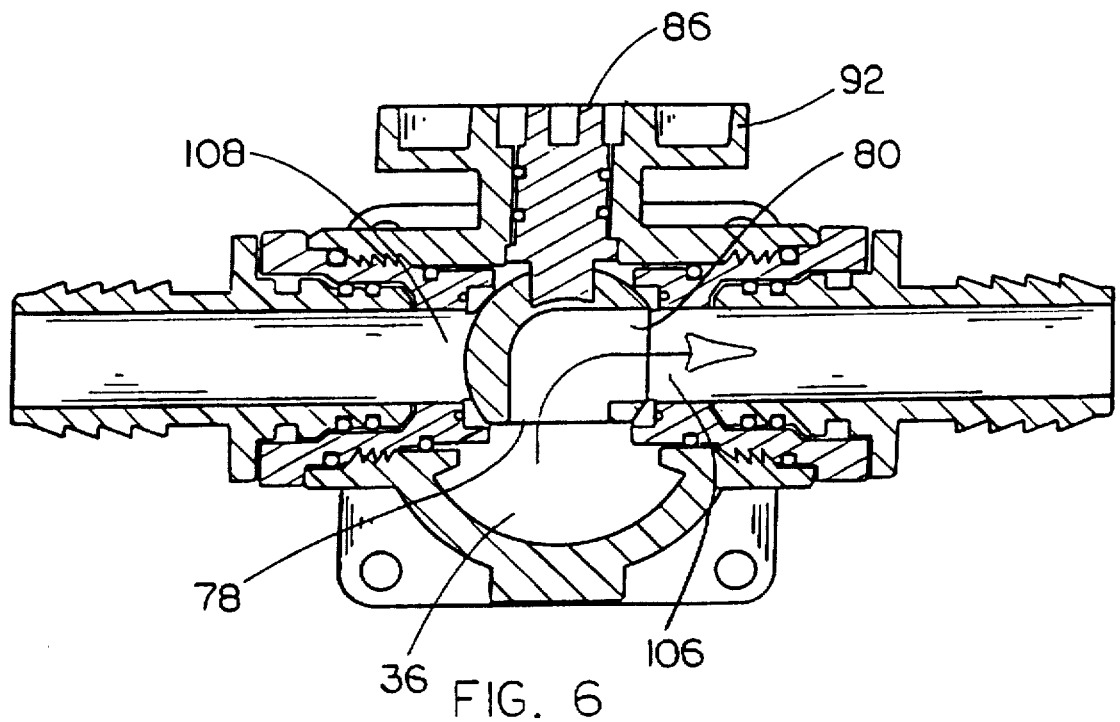
FIG. 6 is a sectional view of the valve with the ball in a position for directing fluid to only one boom.
Figure 7:
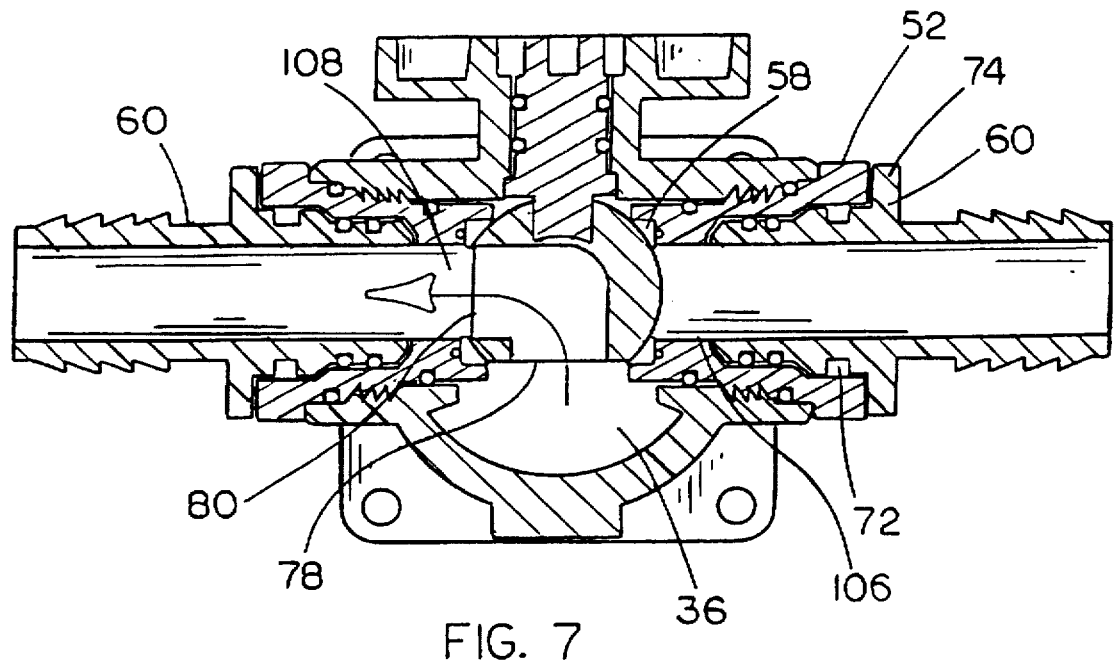
FIG. 7 is a sectional view of the valve with the ball in a position to direct flow only to the other boom.

The two valve seat fittings 52 cooperate to collectively and rotatably support the flow control ball 50 within the internal manifold 36 as shown in FIGS. 5 through 7. Ball 50 is of the two-hole type having a right angle passage establishing communication between a bottom opening 78 and a side opening 80. Ball 50 also has a drive slot 82 formed in the top thereof for receiving a drive plug which protrudes from the underside of stem 86 shown in FIGS. 3 and 5–7. The stem has a collar 88 which engages an interior shoulder 90 (FIG. 5) within an upper portion of the valve body 34 leading to the powerhead support flange 92 a pair of o-rings 94 center the stem 86 within the upper valve body bore 96. The top of stem 86 has a socket 98 for receiving the output shaft of a reversible gear motor housed within the powerhead housing 100 that housing has a transparent dome 102 through which one can see an indicator flag on the powerhead to show the valve position. The reversible motor 104 of each valve 10 is shown schematically in FIG. 4.

The tool operation of the valve 10 as an on-off valve and as a selector valve is shown in FIGS. 5–7. In FIG. 5, the flow control ball is oriented such that the side opening 80 faces one end of the valve body 34, with a result that it blocks fluid communication to either of the valve seat fittings 52. FIG. 5 illustrates the valve in an off position.

FIG. 6 shows the flow control ball rotated 90 degrees where it establishes fluid flow from the internal manifold to and through a first outlet port 106 defined by the right hand valve seat fitting 52 and hose barb fitting 60 in that figure. In this position, fluid flow to the second outlet port defined by the left hand valve seat fitting 52 and hose barb fitting 60 is blocked. Upon rotation of the flow control ball 50 through 180 degrees, past the off position of FIG. 5, the side opening 80 establishes communication with the second outlet port 108 but the closed rearward side of flow control ball 50 blocks fluid flow to the first outlet port 106. Accordingly, FIG. 5 illustrates the ball in a twelve o'clock position wherein the valve is off and no flow occurs through either the first or second outlet port 106 or 108. In the three o'clock position of the ball 50 illustrated in FIG. 6, fluid flow is established to the first outlet port 106 but not to the second outlet port 108. Finally, in the nine o'clock position of the ball as shown in FIG. 7, flow is established from the internal manifold 36 to the second outlet port 108 but flow is blocked to the first outlet port 106. By enabling rotation of the flow control ball into either of two quadrants, the selector valve function is accomplished.

Referring to the schematic electrical and fluid flow diagram of FIG. 4, electrical leads 110 and 112 of motor 104 are connected to an electrical power source such as battery 114, with one lead incorporating a single pole single throw (SPST) switch which controls the on-off function for the motor 104. When the SPST switch 116 is opened, the motor 104 returns the flow controlled ball 50 to the twelve o'clock off position of FIG. 5. The other two electrical leads 118 and 120 of motor 104 are connected to the electrical power source through a double pole double throw (DPDT) switch 122 which is operative to reverse the polarity of the motor 104. Upon switching the DPDT switch 122 to the A position, activation of the motor 104 causes it to rotate through the quadrant leading to the three o'clock position of FIG. 6 where flow is established through the first outlet port 106 to the rear boom section A-1. On the other hand, if the DPDT switch 122 is flipped to the B position, activation of motor 104 causes it to rotate in the opposite quadrant toward the nine o'clock position of FIG. 7 to establish flow through the second outlet port 108 to the front boom section B-1. It is the ability of the valve motor to work one of two selectable quadrants in combination with the on-off switch which account for the dual operation of the valve as a combination selector and shut off valve. Note that the SPST valve 116 may be the boom on-off switch of a flow control monitor.

Figure 8:
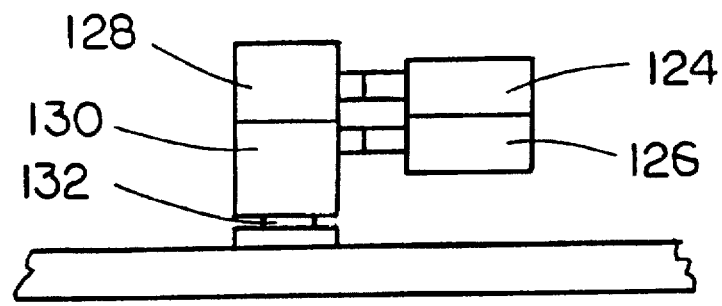
FIG. 8 is a side view of the dual cams on the valve motor associated with the motor control circuitry.
Figure 9:
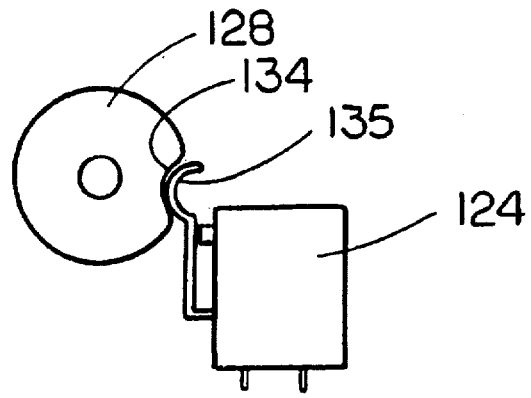
FIG. 9 is a top view of one of the cams and associated microswitch.
Figure 10:
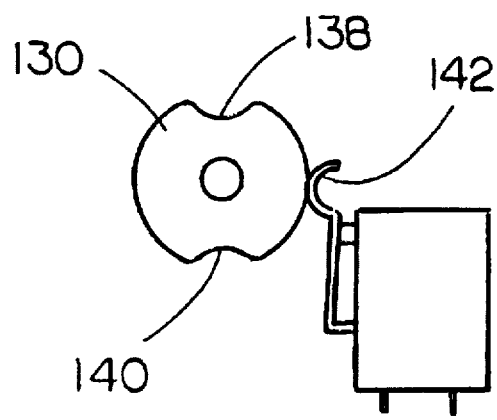
FIG. 10 is a top view of the other cam and associated microswitch.

The motor control circuitry further includes a pair of microswitches 124 and 126 mounted in operative close proximity to dual cams 128 and 130 mounted on the output shaft 132 of motor 104. The shape of the top cam is shown in FIG. 9 wherein a single lobe 134 cooperates with switch actuator 136 to stop the motor upon rotation to the twelve o'clock off position of FIG. 5. The bottom cam 130 has a pair of lobes 138 and 140 which cooperate with the associated switch actuator 142 to stop the motor 104 at the three o'clock position of FIG. 6 or the nine o'clock position of FIG. 7, depending upon the direction of rotation of the motor 104, as determined by the polarity reversing DPDT switch 122. The dual cam lobes 138 and 140 combined with the reversing input polarity from the DPDT switch 122 enables the dual position selection with a common off position. Rotation cannot get "lost" upon a miss switch and always returns to the home or off position of FIG. 8 while searching for the proper but out of sync location.

Use of the stackable combination selector and shut off valve of the present invention eliminates the separate two-way control valve and three-way selector valve which would otherwise both be required to perform the functions of the single valve of this invention. If those were stand alone valves without an internal manifold which enables stacking of the valves, this valve would additionally eliminate the separate and dependent manifold and the various t-fittings and conduits establishing communication between the two-way connector valve, the three-way selector valve and the independent manifold. It can be seen from FIG. 1 that the plumbing of a multi-boom sprayer implement is greatly simplified and cleaned up by the use of the valve of the present invention. Use of the valve is not limited to agricultural sprayers as it is ideally suited for other fluid circuits wherein one or the other but not both of a pair of fluid destinations may be selected. Examples include power cleaning equipment and anti-icing equipment.

Thus there has been shown and described a stackable combination selector and shut off valve which accomplishes at least all of the stated objects.

We claim:

1. A stackable combination selector and shut off valve adapted for connection to a remotely actuated powerhead, comprising a valve body defining an internal flow through manifold, an entry port in communication with said internal manifold for connection to a source of pressurized fluid, and an exit port in communication with said internal manifold for connection to the entry port of another valve body, first and second outlet ports, a ball valve interposed between said internal manifold and said first and second outlet ports, said ball valve being movable between a first position establishing fluid flow from said internal manifold only to said first outlet port, a second position blocking fluid flow from said inlet manifold to both outlet ports, and a third position establishing fluid flow from said internal manifold only to said second outlet port, a valve stem protruding from said ball valve and operative to rotate said ball valve between said first, second and third positions, said valve stem and valve body being adapted for connection to a powerhead for remote actuated powered operation of said valve.

2. The stackable combination selector and shut off valve of claim 1 wherein said ball valve comprises a two hole ball.

3. The stackable combination selector and shut off valve of claim 2 wherein said ball valve further comprises a pair of valve seat inserts, each sealed within a respective one of said first and second outlet ports and each comprising a valve seat engagable with said ball for sealed engagement therebetween.

4. The stackable combination selector and shut off valve of claim 3 further comprising a pair of hose barbs, each adapted to be inserted in sealed engagement into a respective valve seat insert.

5. The stackable combination selector and shut off valve of claim 2 wherein said valve body includes a top, bottom, opposite sides and opposite ends, said entry and exit ports opening through said opposite ends respectively and said first and second outlet ports opening through said opposite sides, respectively.

6. The stackable combination selector and shut off valve of claim 5 wherein said internal manifold is arranged below said ball valve.

7. A stackable and remotely actuatable powered combination selector and shut off valve, comprising a valve body defining an internal flow through manifold, an entry port in communication with said internal manifold for connection to a source of pressurized fluid, and an exit port in communication with said internal manifold for connection to the entry port of another valve body, first and second outlet ports, a ball valve interposed between said internal manifold and said first and second outlet ports, said ball valve being movable between a first position establishing fluid flow from said internal manifold only to said first outlet port, a second position blocking fluid flow from said inlet manifold to both outlet ports, and a third position establishing fluid flow from said internal manifold only to said second outlet port, a valve stem protruding from said ball valve and operative to rotate said ball valve between said first, second and third positions, a powerhead mounted on said valve body and including a reversible motor having an output shaft operatively connected to said valve stem for rotating said valve stem between said first, second and third positions, and a motor control circuit including at least one remote switch operatively associated with said motor for actuating said motor to rotate said ball valve between said first, second and third positions.

8. The stackable and remotely actuatable powered combination selector and shut off valve of claim 7 wherein said at least one remote switch includes a master single pole single throw on-off switch operative to establish and break the electrical connection between said motor and a source of electrical power and a polarity reversing double pole double throw switch operative to determine the direction of rotation said ball valve from said second position to said first or third position in response to actuation of said master single pole single throw switch.

9. The stackable and remotely actuatable powered combination selector and shut off valve of claim 8 wherein said motor controlled circuit further comprises dual cams on said motor output shaft and dual microswitches in operative close proximity to said dual cams, one cam having a pair of spaced apart lobes positioned to trip the associated microswitch upon movement of the ball valve to the first and third positions and the other cam having a cam lobe situated between the pair of lobes of said one cam and positioned to trip the other microswitch to established a common off position corresponding to the second position of said ball valve.

* * * * *